(12) United States Patent
Park et al.

(10) Patent No.: US 11,990,768 B2
(45) Date of Patent: May 21, 2024

(54) ANNULAR RESONATOR AND WIRELESS POWER TRANSMISSION DEVICE INCLUDING ANNULAR RESONATOR

(71) Applicant: Samsung Electronics Co., Ltd., Gyeonggi-do (KR)

(72) Inventors: Jaehyun Park, Gyeonggi-do (KR); Beomwoo Gu, Gyeonggi-do (KR); Jaeseok Park, Gyeonggi-do (KR); Hyunseok Shin, Gyeonggi-do (KR); Sungku Yeo, Gyeonggi-do (KR); Youngho Ryu, Gyeonggi-do (KR); Chongmin Lee, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 207 days.

(21) Appl. No.: 17/583,803

(22) Filed: Jan. 25, 2022

(65) Prior Publication Data

US 2022/0239154 A1    Jul. 28, 2022

Related U.S. Application Data

(63) Continuation of application No. PCT/KR2022/001118, filed on Jan. 21, 2022.

(30) Foreign Application Priority Data

Jan. 25, 2021 (KR) .................. 10-2021-0010259

(51) Int. Cl.
*H02J 50/12* (2016.01)
*H02J 50/00* (2016.01)

(52) U.S. Cl.
CPC ............ *H02J 50/12* (2016.02); *H02J 50/005* (2020.01)

(58) Field of Classification Search
CPC ................................ H02J 50/12; H02J 50/005
USPC ......................................................... 307/104
See application file for complete search history.

(56) References Cited

U.S. PATENT DOCUMENTS

| | | | |
|---|---|---|---|
| 2007/0222542 | A1 | 9/2007 | Joannopoulos et al. |
| 2009/0015075 | A1 | 1/2009 | Cook et al. |
| 2010/0066636 | A1 | 3/2010 | Carr |
| 2011/0134006 | A1 | 6/2011 | Sze et al. |

(Continued)

FOREIGN PATENT DOCUMENTS

| | | |
|---|---|---|
| JP | 2008-298846 | 12/2008 |
| KR | 1020120127233 | 11/2012 |

(Continued)

OTHER PUBLICATIONS

International Search Report dated May 4, 2022 issued in counterpart application No. PCT/KR2022/001118, 12 pages.

*Primary Examiner* — Michael R. Fin
(74) *Attorney, Agent, or Firm* — The Farrell Law Firm, P.C.

(57) ABSTRACT

Disclosed is an annular resonator including a conductor formed on a surface of an annular shaped structure and having a first end and a second end opposite to the first end, and a capacitor having a first end and a second end opposite to the first end, wherein a radius of curvature of a first side facing a center portion of the annular shaped structure is smaller than a radius of curvature of a second side facing an outer periphery of the annular shaped structure, and wherein the first end and the second end of the conductor are electrically connected to the first end and the second end of the capacitor, respectively.

20 Claims, 9 Drawing Sheets

(56) References Cited

U.S. PATENT DOCUMENTS

| | | | |
|---|---|---|---|
| 2012/0247679 A1 | 10/2012 | Yamazawa | |
| 2012/0286726 A1 | 11/2012 | Kim et al. | |
| 2012/0293005 A1 | 11/2012 | Ryu et al. | |
| 2016/0351989 A1 | 12/2016 | Bulja | |
| 2017/0324351 A1* | 11/2017 | Rochford | H03F 3/2176 |
| 2018/0131233 A1 | 5/2018 | Kurs et al. | |
| 2018/0146975 A1 | 5/2018 | Zhang | |
| 2019/0097378 A1 | 3/2019 | Choi | |
| 2022/0246349 A1* | 8/2022 | Stein | H01F 38/14 |

FOREIGN PATENT DOCUMENTS

| | | |
|---|---|---|
| KR | 1020160117574 | 10/2016 |
| KR | 10-1700934 | 1/2017 |
| KR | 1020180134322 | 12/2018 |
| KR | 1020190035405 | 4/2019 |

* cited by examiner

W_ratio = $W_a / W_b$

ANNULAR RESONATOR AND WIRELESS POWER TRANSMISSION DEVICE INCLUDING ANNULAR RESONATOR

CROSS-REFERENCE TO RELATED APPLICATION(S)

This application is a Bypass Continuation Application of International Application No. PCT/KR2022/001118 designating the United States, which was filed on Jan. 21, 2022, and is based on and claims priority under 35 U.S.C. § 119 to Korean Patent Application No. 10-2021-0010259, which was filed in the Korean Intellectual Property Office on Jan. 25, 2021, the entire disclosure of each of which is incorporated herein by reference.

BACKGROUND

1. Field

The disclosure relates generally to a power transmission device, and more particularly, to an annular resonator and a wireless power transmission device including an annular resonator

2. Description of Related Art

A wireless charging technology refers to the use of wireless power transmission/reception such that a battery of a mobile phone can be automatically charged when placed on a wireless power transmission device (for example, charging pad), without connecting the mobile phone to a separate charging connector. Such a wireless charging technology is advantageous in that no connector is necessary to supply power to an electronic product, thereby improving the waterproofing function, and no wired charger is necessary, thereby improving the portability of the electronic device.

Recent development of wireless charging technologies has been followed by research regarding methods for supplying power from a wireless power transmission device to wireless power reception devices, thereby charging the reception devices. Wireless charging technologies include an electromagnetic induction type using coils, a resonance type using resonance, and a radio frequency (RF)/microwave radiation type in which electric energy is converted into microwaves, which are then transferred.

Wireless charging technologies using the electromagnetic induction type or the resonance type have recently been widespread in connection with electronic devices such as smartphones. If a wireless power transmitting unit (PTU) (for example, wireless power transmission device) and a wireless power receiving unit (PRU) (for example, smartphone or wearable electronic device) contact or approach within a designated distance, the battery of the PRU may be charged by a method such as electromagnetic induction or electromagnetic resonance between the transmitting coil or resonator of the PTU and the receiving coil or resonator of the PRU.

A PTU or wireless power transmission device may include a resonator or coil capable of generating an inductive magnetic field if an electric current flows according to the resonance type or induction type. The resonance may have a varying shape causing varying characteristics regarding wireless power transmission.

For example, if the resonator is implemented as an annular resonator, the annular resonator may have a circular section and may be structured to have symmetry between the inner surface, which faces from the resonator surface to the center portion, and the outer surface, which faces the outer periphery of the resonator.

Magnetic fields may be formed through the annular resonator irrespective of the sectional structure of the annular resonator such that the type of a magnetic field formed on the inner surface of the annular resonator may differ from that of a magnetic field formed on the outer surface.

If the inner and outer surface types of the annular resonator are formed in a symmetric structure, there is no alignment with the magnetic field radiation type, thereby increasing current crowding. In addition, the flow of electric current is nonuniform, thereby increasing resistance. This causes degrading of the resonator efficiency.

As such, there is a need in the art for a resonator that mitigates the current crowding and increased resistance of the prior art resonator.

SUMMARY

The disclosure has been made to address at least the above-mentioned problems and/or disadvantages and to provide at least the advantages described below.

Accordingly, an aspect of the disclosure is to provide an annular resonator and a wireless power transmission device including an annular resonator, wherein the curvature of the inner surface of the annular resonator, which faces from the surface of the resonator towards the center portion, and the curvature of the outer surface of the annular resonator, which faces the outer periphery of the resonator, are aligned with the curvature of a magnetic field formed by the resonator, thereby improving the wireless power transmission efficiency of the resonator.

Another aspect of the disclosure is to provide an annular resonator and a wireless power transmission device including an annular resonator, wherein the curvature of the inner surface of the resonator section of the annular resonator and that of the outer surface of the annular resonator are aligned with the curvature of a magnetic field formed by the resonator, thereby reducing current crowding and providing a uniform flow of electric current which reduces resistance.

Another aspect of the disclosure is to provide an annular resonator and a wireless power transmission device including an annular resonator, wherein the curvature of the inner surface of the resonator section of the annular resonator and that of the outer surface of the annular resonator are aligned with the curvature of a magnetic field formed by the resonator, thereby increasing the quality (Q)-factor, improving the transmission efficiency of the wireless power transmission device, and increasing the transmission distance.

In accordance with an aspect of the disclosure, a resonator includes a conductor formed on a surface of an annular shaped structure and having a first end and a second end opposite to the first end, and a capacitor having a first end and a second end opposite to the first end, wherein a radius of curvature of a first side facing a center portion of the annular shaped structure is smaller than a radius of curvature of a second side facing an outer periphery of the annular shaped structure, and wherein the first end and the second end of the conductor are electrically connected to the first end and the second end of the capacitor, respectively.

In accordance with an aspect of the disclosure, a resonator includes an annular shaped structure, and conductor formed on a surface of the annular shaped structure, wherein, in a cross section of the annular shaped structure, a first area of a first region formed by a first side facing a center portion of the annular shaped structure among regions formed outside the annular shaped structure within a minimum area rectangle configured to receive the cross section of the annular shaped structure is greater than a second area of a second region formed by a second side facing the outer periphery of the annular shaped structure.

In accordance with an aspect of the disclosure, a resonator includes an annular shaped structure, and a conductor formed on a surface of the annular shaped structure, wherein, in a cross section of the annular shaped structure, a maximum length in a first direction perpendicular to a direction from the annular shaped structure toward a center portion of the annular shaped structure is greater than a maximum length in a second direction corresponding to a direction facing the center portion of the annular shaped structure.

In accordance with an aspect of the disclosure, a wireless power transmission device includes an amplifying circuit configured to amplify input power, an impedance matching circuit electrically connected to the amplifying circuit, a feeding loop electrically connected to the impedance matching circuit, and a resonator electromagnetically coupled to the feeding loop, wherein the resonator comprises a conductor formed on a surface of the annular shaped structure and having a first end and a second end opposite to the first end, and the capacitor having a first end and a second end opposite to the first end, and wherein a radius of curvature of a first side facing a center portion of the annular shaped structure is smaller than a radius of curvature of a second side facing an outer periphery of the annular shaped structure, and the first end and the second end of the conductor and the first end and the second end of the capacitor are electrically connected to each other, respectively.

In accordance with an aspect of the disclosure, a wireless power transmission device includes an amplifying circuit configured to amplify input power, an impedance matching circuit, and a resonator, wherein the resonator comprises a conductor formed on a surface of the annular shaped structure, and wherein, in a cross section of the annular shaped structure, a first area of a first region formed by a first side facing a center portion of the annular shaped structure among regions formed outside the annular shaped structure within a minimum area rectangle configured to receive the cross section of the annular shaped structure is greater than a second area of a second region formed by a second side facing the outer periphery of the annular shaped structure.

In accordance with an aspect of the disclosure, a wireless power transmission device includes an amplifying circuit configured to amplify input power, an impedance matching circuit, and a resonator, wherein the resonator comprises a conductor formed on a surface of the annular shaped structure, and wherein, in a cross section of the annular shaped structure, a maximum length in a first direction perpendicular to a direction facing a center portion of the annular shaped structure from the annular shaped structure is greater than a maximum length in a second direction facing the center portion of the annular shaped structure.

BRIEF DESCRIPTION OF THE DRAWINGS

The above and other aspects, features, and advantages of certain embodiments of the disclosure will be more apparent from the following detailed description taken in conjunction with the accompanying drawings, in which.

DETAILED DESCRIPTION

Figure 1A:
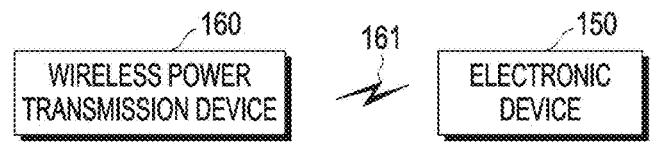
FIG. 1A illustrates a wireless power transmission device and a wireless power reception device according to an embodiment.

Hereinafter, embodiments of the disclosure will be described in detail with reference to the accompanying drawings. It should be noted that, in the drawings, the same or like elements are designated by the same or like reference signs as much as possible. In the following description and drawings, a detailed description of known functions or configurations that may make the subject matter of the disclosure unnecessarily unclear will be omitted.

It should be appreciated that embodiments of the disclosure and the terms used therein are not intended to limit the technological features set forth herein to particular embodiments and include various changes, equivalents, or alternatives for a corresponding embodiment. With regard to the description of the drawings, similar reference numerals may be used to designate similar or relevant elements. It is to be understood that a singular form of a noun corresponding to an item may include one or more of the items unless the relevant context clearly indicates otherwise.

As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "a first", "a second", "the first", and "the second" may be used to simply distinguish a corresponding element from another and do not limit the elements in importance or order. It is to be understood that if an element (e.g., a first element) is referred to, with or without the term "operatively" or "communicatively", as "coupled with," "coupled to," "connected with," or "connected to" another element (e.g., a second element), this indicates that the element may be coupled/connected with/to the other element directly (e.g., wiredly), wirelessly, or via a third element.

FIG. 1A illustrates a wireless power transmission device and a wireless power reception device according to an embodiment. Referring to FIG. 1A, a wireless power transmission device 160 may transmit power 161 to a wireless power reception device 150 (hereinafter, an electronic device 150 or an external electronic device) wirelessly according to various charging methods. For example, the wireless power transmission device 160 may transmit power 161 according to an induction method, in which case the wireless power transmission device 160 may include a power source, a direct current-alternating current (DC-AC) conversion circuit, an amplifying circuit, an impedance matching circuit, at least one capacitor, at least one coil, and a communication modulation/demodulation circuit. The at least one capacitor may constitute a resonance circuit together with at least one coil. The wireless power transmission device 160 may operate in a method defined in a wireless power consortium (WPC) standard (or, Qi standard).

For example, the wireless power transmission device 160 may transmit power 161 according to a resonance type, wherein the wireless power transmission device 160 may include a power source, a DC-AC conversion circuit, an amplifying circuit, an impedance matching circuit, at least one capacitor, at least one resonator or coil, and an out band communication circuit (e.g., a Bluetooth™ low energy (BLE) communication circuit). At least one capacitor and at least one resonator or a coil may constitute a resonance circuit. The wireless power transmission device 160 may operate in a method defined in an alliance for wireless power (A4WP) standard (or an air fuel alliance (AFA) standard). The wireless power transmission device 160 may include a resonator or a coil capable of generating an inductive magnetic field when a current flows according to a resonance method or an induction type. The process in which the wireless power transmission device 160 generates an inductive magnetic field may be expressed as that the wireless power transmission device 160 wirelessly transmits power 161. In addition, the electronic device 150 may include a coil configured to allow an induced electromotive force to be generated by a magnetic field, which is formed around the coil and varies in strength according to time. The process in which the electronic device 150 generates an induced electromotive force through a resonator or a coil may be expressed as that the electronic device 150 wirelessly receives power 161.

The wireless power transmission device 160 may perform a communication with the electronic device 150 according to an in-band method. For example, the wireless power transmission device 160 or the electronic device 150 may be configured to change a load (or an impedance) in response to data to be transmitted according to an on/off keying modulation scheme. The wireless power transmission device 160 or the electronic device 150 may identify data to be transmitted from a counterpart device by measuring a load change (or an impedance change) based on changes in the magnitude of current, voltage or power of a resonator or a coil.

For example, the wireless power transmission device 160 may perform communication with the electronic device 150 according to an out-band (or out-of-band) method. The wireless power transmission device 160 or the electronic device 150 may transmit/receive data by using a short-distance communication module (e.g., a BLE communication module) separately provided with a resonator, a coil, or a patch antenna.

Figure 1B:
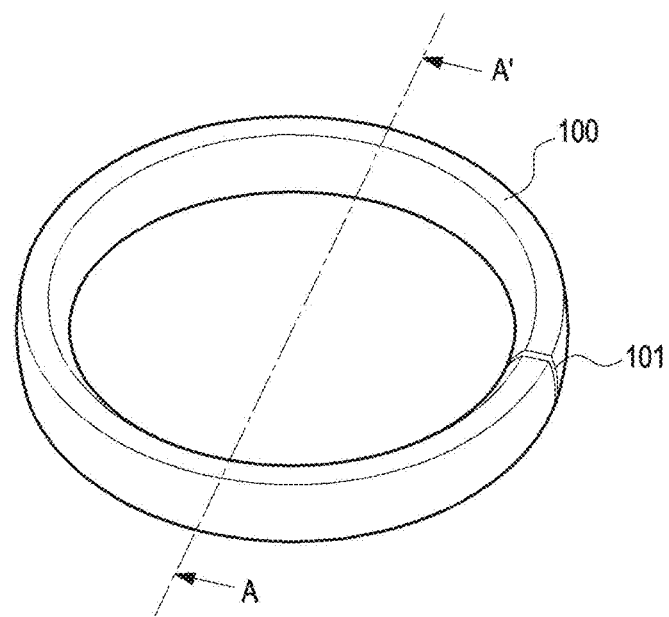
FIG. 1B is a perspective view of an annular resonator according to an embodiment.

FIG. 1B is a perspective view of an annular resonator according to an embodiment. Referring to FIG. 1B, the resonator 100 applicable to the wireless power transmission device 160 may be configured in an annular shaped structure which, with reference to the A-A' axis, a side from a surface toward a center portion of the annular shaped structure may be defined in an inner side of the annular shaped structure, and a side from the surface toward an outer periphery of the annular shaped structure may be defined in an outer side of the annular shaped structure. A slit 101 may be formed through at least a part of the annular shaped structure and may function as a capacitor. When the annular shaped structure is connected to a circuit part of the wireless power transmission device 160, the annular shaped structure and a capacitor may be connected to the circuit part through both ends through which the slit 101 is formed. A conductor may be formed on the surface of the annular shaped structure. In the annular shaped structure, when a current is supplied to the both ends through which the slit 101 is formed, a high-frequency wave may be transmitted through the surface of the annular shaped structure.

Figure 2:
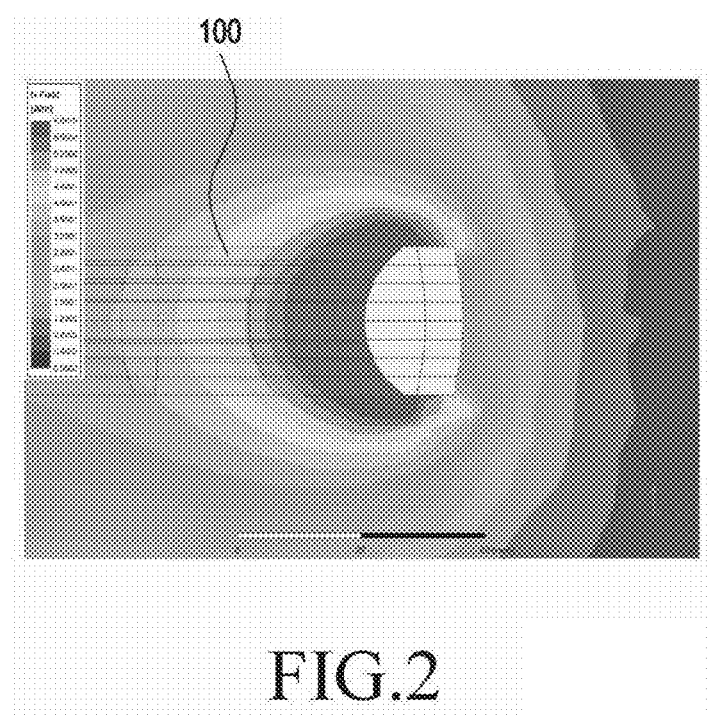
FIG. 2 illustrates the strength of a magnetic field formed around an annular resonator according to an embodiment.

FIG. 2 illustrates the strength of a magnetic field formed around an annular resonator according to an embodiment. Referring to FIG. 2, the forms of a magnetic field formed from the inner side toward a center portion toward among the surface of the annular resonator 100 and a magnetic field formed from the outer side toward an outer periphery among the surface of the annular resonator 100 may be different. For example, the strength of a magnetic field formed from the inner side toward the center portion of the annular resonator 100 may be larger than the strength of a magnetic field formed from the outer side toward the outer periphery of the annular resonator 100. The curvature of a magnetic field formed from the inner side toward the center portion of the annular resonator 100 may be larger than the curvature of a magnetic field formed from the outer side toward the outer periphery of the annular resonator 100. A radius of curvature of a magnetic field formed from the inner side toward the center portion of the annular resonator 100 may be smaller than a radius of curvature of a magnetic field formed from the outer side toward the outer periphery of the annular resonator 100.

For example, when a resonator is implemented in an annular resonator, the cross section of the annular resonator may be a circle, and the inner side and the outer side of the resonator may be symmetrically formed. A magnetic field formed through the annular resonator may be irrelevant to the cross sectional structure of the annular resonator, and as illustrated in FIG. 2, the form of a magnetic field formed in the inner side of the annular resonator and the form of a magnetic field formed in the outer side of the annular resonator may be different.

When the shape of the inner side and the shape of the outer side of the annular resonator are formed in a symmetrical structure, the inner side and the outer side thereof may not be aligned with a radiation form of a magnetic field, which increases a current crowding phenomenon, and a flow of current is non-uniform, thereby causing decreased resonator efficiency as resistance increases.

In the annular resonator described herein, the wireless power transmission efficiency can be enhanced by aligning the curvatures of an inner side and an outer side of a resonator cross section with the curvature of a magnetic field formed by the resonator.

Figure 3:
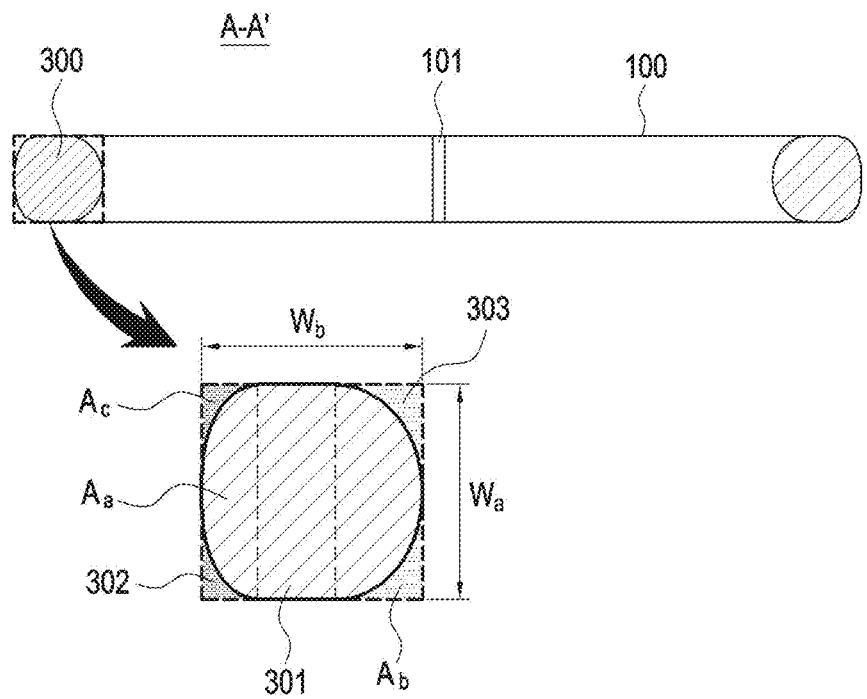
FIG. 3 illustrates a cross section of an annular resonator according to an embodiment.

FIG. 3 illustrates a cross section of an annular resonator according to an embodiment. Referring to FIG. 3, with reference to the A-A' axis in the annular resonator 100 of FIG. 1B, a side toward a center portion among the surface of the annular shaped structure may be defined in an inner side of the annular shaped structure, and a side toward an outer periphery among the surface of the annular shaped structure may be defined in an outer side of the annular shaped structure. The cross section 300 of the annular resonator 100 may have an asymmetrically formed inner side and outer side in order to align with the curvature of a magnetic field.

The curvature of a first side facing the center portion of the annular shaped structure may be greater than the curvature of a second side facing the outer periphery of the annular shaped structure. For example, a radius of curvature of the first side facing the center portion of the annular shaped structure may be smaller than a radius of curvature of the second side facing the outer periphery of the annular shaped structure. For example, the ratio of the curvature of the first side to the curvature of the second side may be greater than 1. The ratio of the curvature radius of the first side to the curvature radius of the second side may be less than 1.

An area of an inner region 301 of the cross section 300 of the annular shaped structure may be expressed as $A_a$. A minimum area rectangle configured to receive the cross section 300 of the annular shaped structure may have length $W_a$ in a first direction and length $W_b$ in a second direction. An area of the minimum area rectangle configured to receive the cross section 300 of the annular shaped structure may be $W_a \times W_b$. In the cross section of the annular shaped structure, the first direction may correspond to a direction perpendicular to a direction from the annular shaped structure toward the center portion of the annular shaped structure, and $W_a$ may be a maximum length in the first direction of the cross section 300 of the annular shaped structure. In the cross section of the annular shaped structure, the second direction may correspond to a direction from the annular shaped structure toward the center portion of the annular shaped structure, and $W_b$ may be a maximum length in the second direction of the cross section 300 of the annular shaped structure.

In the cross section 300 of the annular shaped structure, a first area $A_b$ of a first region 303 formed by the first side facing the center portion of the annular shaped structure among a first region 303 and a second region 302 formed outside the cross section 300 excluding an area $A_a$ of the cross section inner region 301 of the annular shaped structure within the minimum area rectangle configured to receive the cross section 300 of the annular shaped structure may be larger than a second area $A_c$ of a second region 302 formed by the second side facing the outer periphery of the annular shaped structure. For example, the ratio of the first area $A_b$ of the first region 303 formed by the first side facing the center portion of the annular shaped structure to the second area $A_c$ of the second region 302 formed by the second side facing the outer periphery of the annular shaped structure may be greater than 1 as in the following Equation (1).

$$\frac{A_b}{A_c} > 1 \qquad (1)$$

Figure 4A:
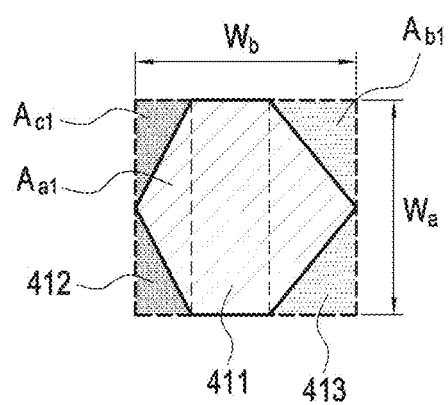
FIG. 4A illustrates a cross section of an annular resonator according to an embodiment.
Figure 4B:
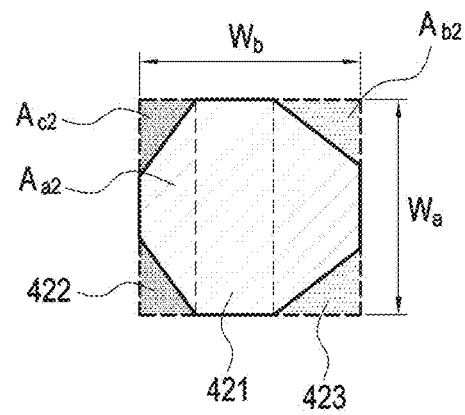
FIG. 4B illustrates a cross section of an annular resonator according to an embodiment.

The cross section 300 of the annular shaped structure may be formed in a curved surface as illustrated in FIG. 3, and alternatively, may be formed in a polygon as illustrated in FIGS. 4A and 4B.

In the cross section 300 of the annular shaped structure, the maximum length $W_a$ in a first direction perpendicular to a direction from the annular shaped structure toward the center portion of the annular shaped structure may be greater than the maximum length $W_b$ in the second direction facing the center portion of the annular shaped structure. For example, the ratio of the maximum length $W_a$ in the first direction to the maximum length $W_b$ in the second direction corresponding to a direction facing the center portion of the annular shaped structure may be greater than 1 and less than 10 as in the following Equation (2).

$$1 < \frac{W_a}{W_b} < 10 \qquad (2)$$

The ratio of the maximum length $W_a$ in the first direction to the maximum length $W_b$ in the second direction facing the center portion of the annular shaped structure may be greater than 3 and less than 5. The ratio of the maximum length $W_a$ in the first direction to the maximum length $W_b$ in the second direction facing the center portion of the annular shaped structure may be greater than 1.5 and less than 5. The ratio of the maximum length $W_a$ in the first direction to the maximum length $W_b$ in the second direction facing the center portion of the annular shaped structure may be greater than 2 and less than 4.5.

FIGS. 4A and 4B illustrate a cross section of an annular resonator formed in a polygonal shape according to an embodiment.

Referring to FIG. 4A, in a cross section of the annular shaped structure formed in a polygon, a first area $A_{b1}$ of a first region 413 formed by a first side facing a center portion of the annular shaped structure among a first region 413 and a second region 412 formed outside the cross section excluding an area $A_{a1}$ of a cross section inner region 411 of the annular shaped structure within a minimum area rectangle configured to receive the cross section of the annular shaped structure may be greater than a second area $A_{c1}$ of a second region 412 formed by the second side facing the outer periphery of the annular shaped structure. For example, the ratio of the first area $A_{b1}$ of the first region 413 formed by the first side facing the center portion of the annular shaped structure to the second area $A_{c1}$ of a second region 412 formed by the second side facing the outer periphery of the annular shaped structure may be greater than 1 as in the following Equation (3).

$$\frac{A_{b1}}{A_{c1}} > 1 \qquad (3)$$

Referring to FIG. 4B, in a cross section of the annular shaped structure formed in a polygon, a first area $A_{b2}$ of a first region 423 formed by a first side facing a center portion of the annular shaped structure among a first region 423 and a second region 422 formed outside the cross section excluding an area $A_{a2}$ of a cross section inner region 421 of the annular shaped structure within a minimum area rectangle configured to receive the cross section of the annular shaped structure may be greater than a second area $A_{c2}$ of a second region 422 formed by the second side facing the outer periphery of the annular shaped structure. For example, the ratio of the first area $A_{b2}$ of the first region 423 formed by the first side facing the center portion of the annular shaped structure to the second area $A_{c2}$ of the second region 422 formed by the second side facing the outer periphery of the annular shaped structure may be greater than 1 as in the following Equation (4).

$$\frac{A_{b2}}{A_{c2}} > 1 \quad (4)$$

Figure 5:
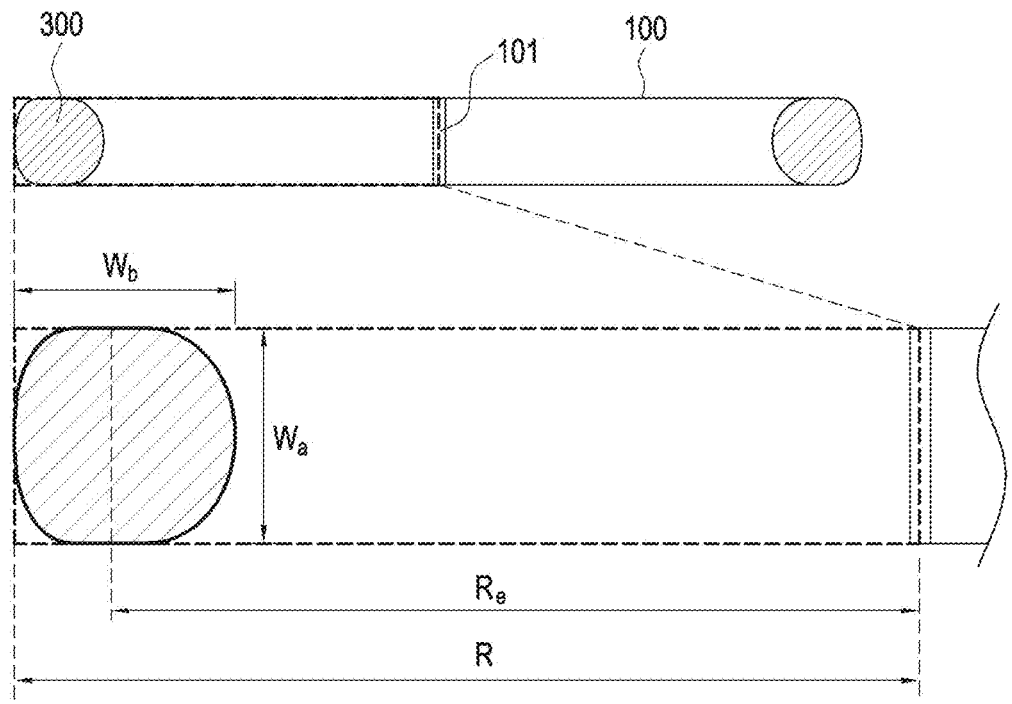
FIG. 5 illustrates the distance between a cross section and a center portion of an annular resonator according to an embodiment.
Figure 6:
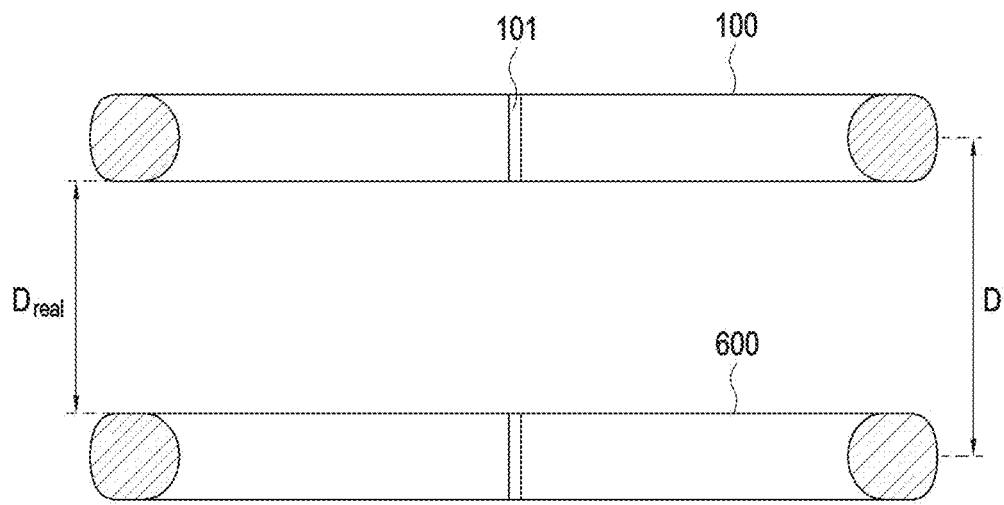
FIG. 6 illustrates the distance between a transmission-side resonator and a reception-side resonator according to an embodiment.

FIG. 5 illustrates the distance between a cross section and a center portion of an annular resonator according to an embodiment. FIG. 6 illustrates the distance between a transmission side resonator and a reception side resonator according to an embodiment.

Referring to FIGS. 5 and 6, on a plane with line A-A' as an axis, a maximum radius of an annular shaped structure may be referred to as a first radius R. In the annular shaped structure, with reference to a boundary between a first side facing a center portion of the annular shaped structure and a second side facing an outer periphery of the annular shaped structure, a radius of the annular shaped structure may be referred to as a second radius $R_e$.

In a cross section 300 of the annular shaped structure, a Q-factor increases as a maximum length $W_b$ in a second direction facing the center portion of the annular shaped structure increases, but the second radius $R_e$ through which an average current flows decreases. Therefore, a coupling coefficient k between a resonator 100 of a wireless power transmission device and a resonator 600 of a wireless power reception device may decrease. A Q-factor increases as a maximum length $W_a$ in a first direction perpendicular to a direction facing the center portion of the annular shaped structure increases, but when a minimum distance $D_{real}$ between the resonator 100 of a wireless power transmission device and the resonator 600 of a wireless power reception device is fixed, as illustrated in FIG. 6, a distance D between a central axis of the resonator 100 of a wireless power transmission device and a central side of the resonator 600 of a wireless power reception device increases. Therefore, a coupling coefficient between resonators may decrease.

When the condition of the following Equation (5) is satisfied, an efficiency of a wireless power transmission device may relatively increase.

$$1 < \frac{R}{W_a} < 20 \quad (5)$$

Figure 7:
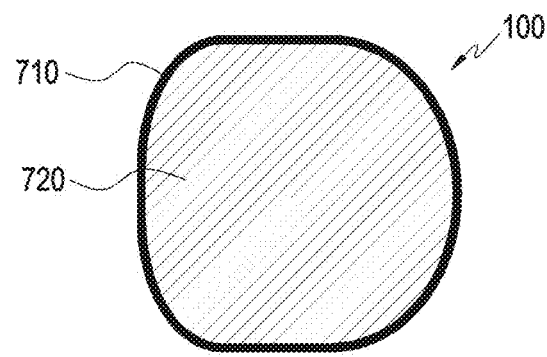
FIG. 7 illustrates a manufacturing method of an annular resonator according to an embodiment.

FIG. 7 illustrates a manufacturing method of an annular resonator according to an embodiment. Referring to FIG. 7, in a resonator 100 of a wireless power transmission device, in the case of a high-frequency wave (e.g., 6.78 megahertz (MHz)), a current may flow only on a surface the resonator 100 of a wireless power transmission device. Therefore, a conductor 710 (e.g., copper) may be formed on the surface of the resonator 100. To this end, as illustrated in FIG. 7, the conductor 710 may be plated or deposited on the surface of a resonator body 720.

Figure 8:
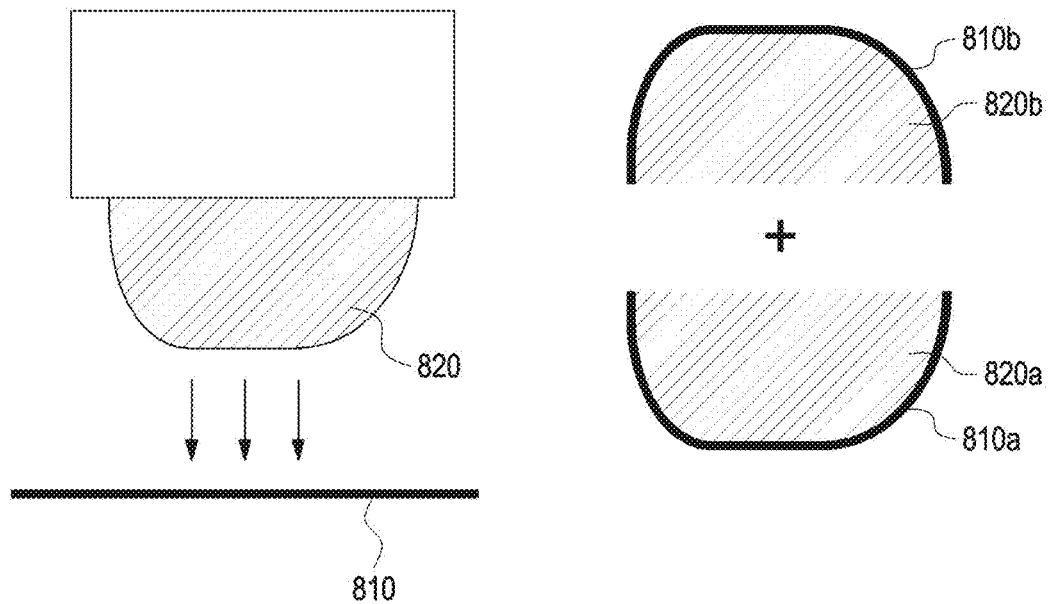
FIG. 8 illustrates a manufacturing method of an annular resonator according to an embodiment.

FIG. 8 illustrates a manufacturing method of an annular resonator according to an embodiment. Referring to FIG. 8, conductor 810 is press-molded by a mold 820. For example, a lower conductor 810*a* is press-molded by a lower mold 820*a* and an upper conductor 810*b* is press-molded by an upper mold 820*b*. An upper structure and a lower structure may then be joined to manufacture an annular resonator 100. The manufacturing method of an annular resonator may vary, and may not be limited to the method illustrated in FIG. 7 or 8.

Figure 9A:
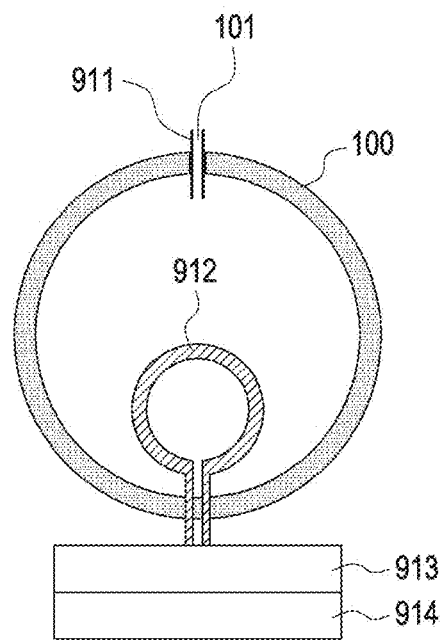
FIG. 9A illustrates a wireless power transmission device including an annular resonator according to an embodiment.
Figure 9B:
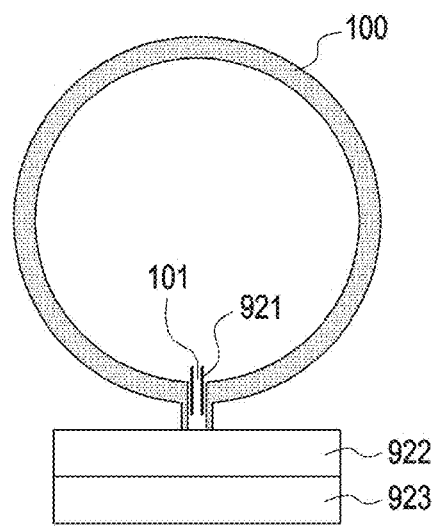
FIG. 9B illustrates a wireless power transmission device including an annular resonator according to an embodiment.

FIGS. 9A and 9B illustrate a wireless power transmission device including an annular resonator according to an embodiment. Referring to FIG. 9A, a wireless power transmission device may include an amplifying circuit 914, an impedance matching circuit 913, a feeding loop 912, and an annular resonator 100. The wireless power transmission device may amplify power to be transmitted, through the amplifying circuit 914, and then may transmit the amplified power to the feeding loop 912 through the impedance matching circuit 913. The feeding loop 912 may form a magnetic field by a supplied current, and the annular resonator 100 may be electromagnetically coupled to the feeding loop 912 and thus be magnetically induced. The annular resonator 100 may form a magnetic field by power induced through a coupling with the feeding loop 912 to transmit power to a wireless power reception device. A slit 101 may be formed through a side of the annular resonator 100, and a capacitor 911 may be added to the slit 101.

Referring to FIG. 9B, a wireless power transmission device may include an amplifying circuit 923, an impedance matching circuit 922, and an annular resonator 100. The wireless power transmission device may amplify power to be transmitted, through the amplifying circuit 923, and then may transmit the amplified power to the annular resonator 100 through the impedance matching circuit 922. The annular resonator 100 may form a magnetic field by a current supplied from the impedance matching circuit 922 to transmit power to a wireless power reception device. A slit 101 may be formed through a side of the annular resonator 100, and a capacitor 921 may be added to the slit 101. The capacitor 921 may be included in the impedance matching circuit 922.

Figure 10:
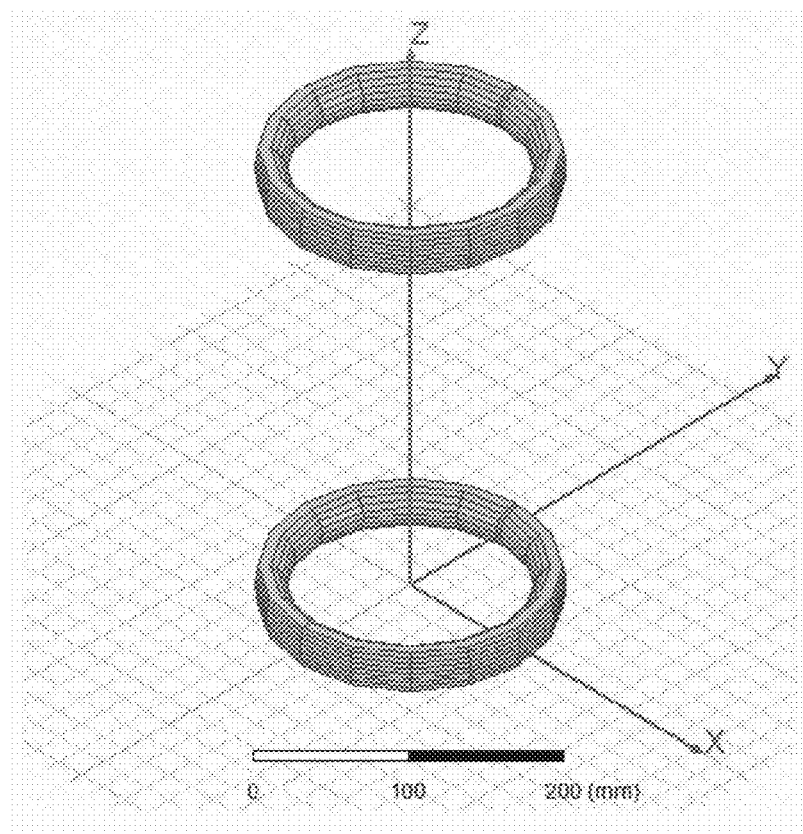
FIG. 10 illustrates the distance between a transmission-side resonator and a reception-side resonator according to an embodiment.

FIG. 10 illustrates the distance between a transmission-side resonator and a reception-side resonator according to an embodiment. Referring to FIG. 10, a transmission-side resonator of a wireless power transmission device and a reception-side resonator of a wireless power reception device may be disposed to be a predetermined distance spaced apart from each other in a z-axis direction. An induced electromotive force may be generated in a reception-side resonator by a magnetic field formed from a transmission-side resonator to transmit power from a wireless power transmission device to a wireless power reception.

Figure 11:
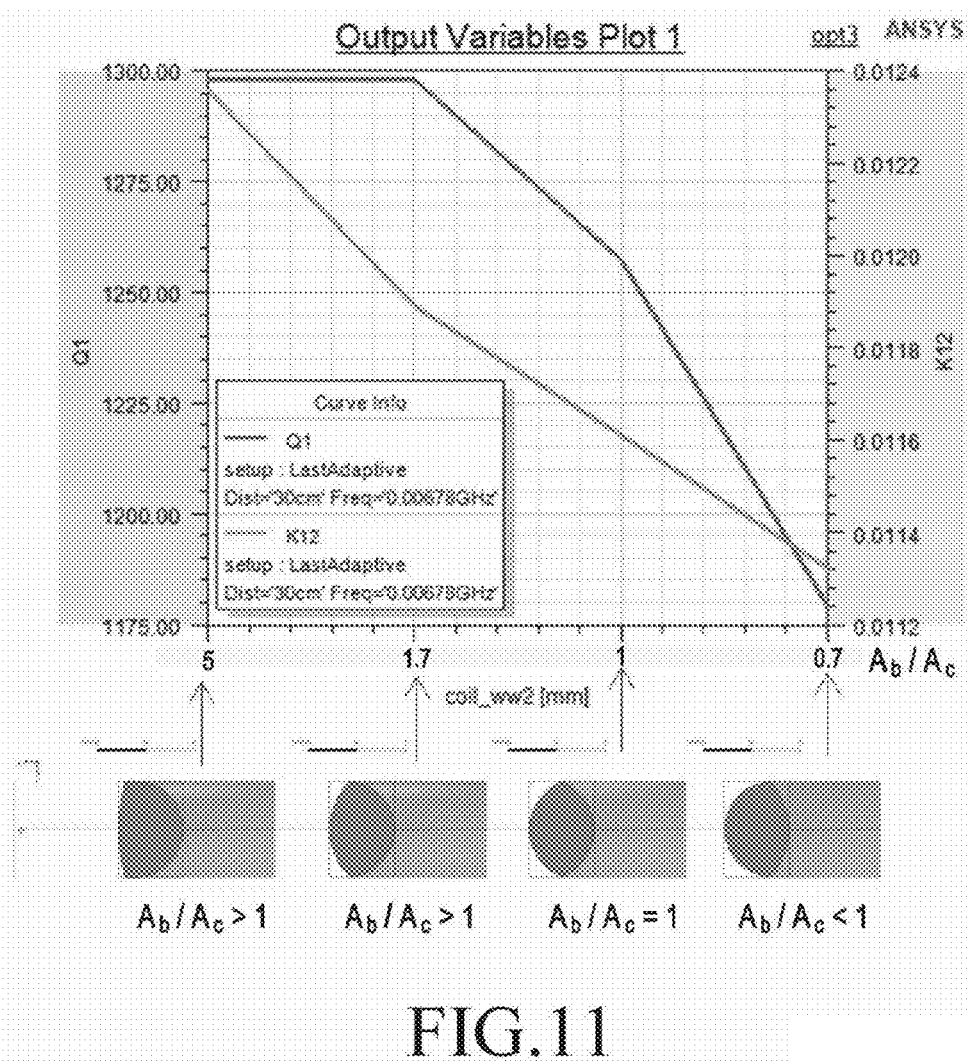
FIG. 11 illustrates a Q-factor and a coupling coefficient according to a cross section of an annular resonator according to an embodiment.

FIG. 11 illustrates a Q-factor and a coupling coefficient according to a cross section of an annular resonator according to an embodiment. Referring to FIG. 11, in the cross section 300 of annular shaped structure illustrated in FIG. 3, a Q-factor and a coupling coefficient k may vary according to the ratio of the first area $A_b$ of the first region 303 formed by the first side facing the center portion of the annular shaped structure to the second area $A_e$ of the second region 302 formed by the second side facing the outer periphery of the annular shaped structure.

Referring to FIG. 11, it may be known that a Q-factor and a coupling coefficient k increase as $A_b/A_c$ increases. Therefore, in the cross section of the annular shaped structure, a Q-factor and a coupling coefficient may be increased by decreasing the radius of curvature of the inner side to be smaller than the radius of curvature of the outer side. For example, when $A_b/A_c$ is 1 rather than being less than 1, it may be known that a Q-factor and a coupling coefficient increase, and when $A_b/A_c$ is greater than 1 instead of being 1, it may be known that a Q-factor and a coupling coefficient increase.

Figure 12:
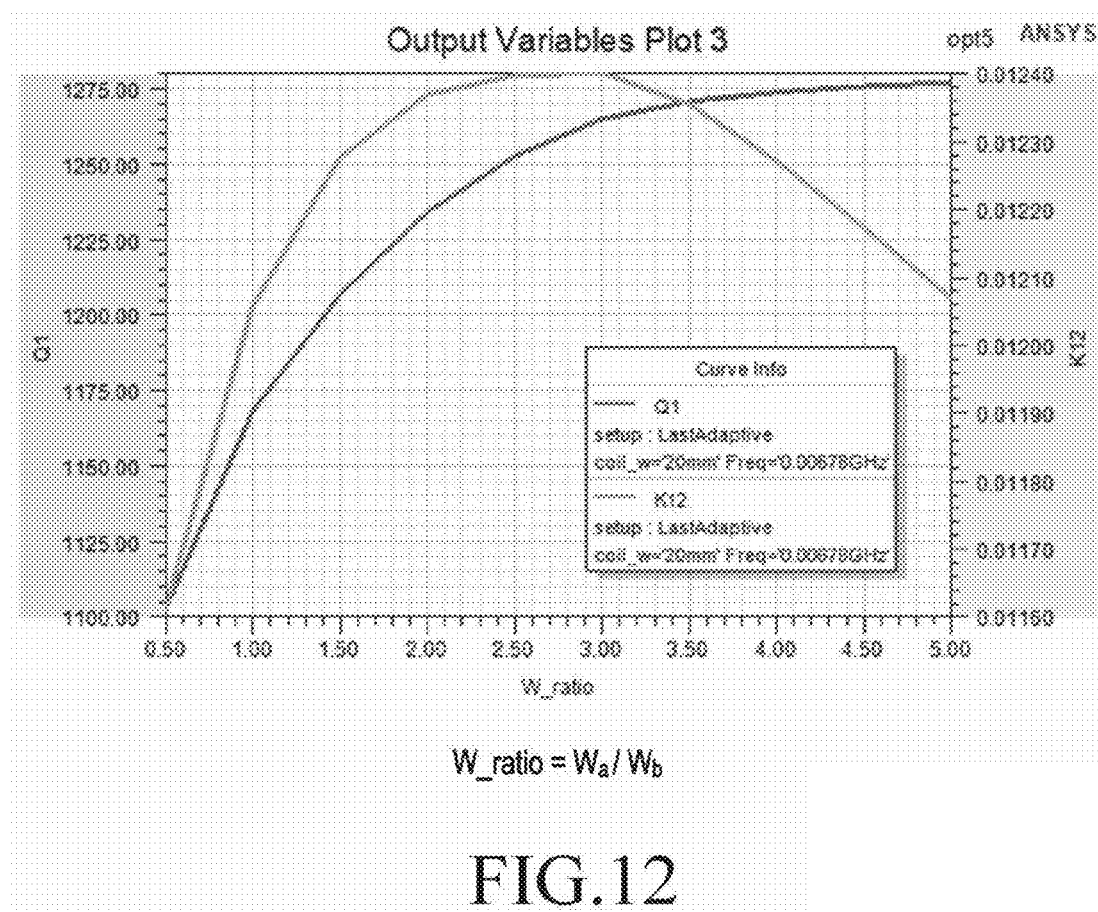
FIG. 12 illustrates a Q-factor and a coupling coefficient according to a cross section of an annular resonator according to an embodiment.

FIG. 12 illustrates a Q-factor and a coupling coefficient according to a cross section of an annular resonator according to an embodiment. Referring to FIG. 12, in the cross section 300 of the annular shaped structure as described above in reference to Equation (2), a Q-factor and a coupling coefficient may increase as the maximum length $W_a$ in a first direction perpendicular to a direction from the annular shaped structure toward the center portion of the annular shaped structure is greater than the maximum length $W_b$ in the second direction facing the center portion of the annular shaped structure.

Referring to FIG. 12, as in Equation (2), when the ratio of the maximum length $W_a$ in the first direction to the maximum length $W_b$ in the second direction facing the center portion of the annular shaped structure is greater than 1 and is less than 10, a Q-factor and a coupling coefficient may increase.

When the ratio of the maximum length $W_a$ in the first direction to the maximum length $W_b$ in the second direction facing the center portion of the annular shaped structure is greater than 3 and less than 5, a Q-factor may closely approach a maximum value, and a coupling coefficient may be at least 0.012.

When the ratio of the maximum length $W_a$ in the first direction to the maximum length $W_b$ in the second direction facing the center portion of the annular shaped structure is greater than 1.5 and less than 5, a Q-factor may be at least 1200 and a coupling coefficient may be at least 0.012.

When the ratio of the maximum length $W_a$ in the first direction to the maximum length $W_b$ in the second direction facing the center portion of the annular shaped structure is greater than 2 and less than 4.5, a Q-factor may be at least 1225 and a coupling coefficient may be at least 0.0125.

As described above, a resonator includes a conductor formed on a surface of an annular shaped structure, wherein a radius of curvature of a first side facing a center portion of the annular shaped structure is smaller than a radius of curvature of a second side facing an outer periphery of the annular shaped structure.

In a cross section of the annular shaped structure, a first area $A_b$ of a first region formed by the first side facing the center portion of the annular shaped structure among regions formed outside the annular shaped structure within a minimum area rectangle configured to receive the cross section of the annular shaped structure is greater than a second area $A_c$ of a second region formed by the second side facing the outer periphery of the annular shaped structure.

As described above, a resonator includes a conductor formed on a surface of an annular shaped structure in which a first area $A_b$ of a first region formed by a first side facing a center portion of the annular shaped structure among regions formed outside the annular shaped structure within a minimum area rectangle configured to receive the cross section of the annular shaped structure is greater than a second area $A_c$ of a second region formed by a second side facing the outer periphery of the annular shaped structure.

The cross section of the annular shaped structure is formed in a curved surface.

The cross section of the annular shaped structure is formed in a polygon.

As described above, a resonator includes a conductor formed on a surface of an annular shaped structure in which a maximum length $W_a$ in a first direction perpendicular to a direction from the annular shaped structure toward a center portion of the annular shaped structure is greater than a maximum length $W_b$ in a second direction corresponding to a direction facing the center portion of the annular shaped structure.

A ratio of the maximum length in the first direction to the maximum length in the second direction is greater than 3 and less than 5.

A ratio of the maximum length in the first direction to the maximum length in the second direction is greater than 1 and less than 10.

A ratio of the maximum length in the first direction to the maximum length in the second direction is greater than 1.5 and less than 5.

The ratio of the maximum length in the first direction to the maximum length in the second direction is greater than 2 and less than 4.5.

As described above, a wireless power transmission device includes an amplifying circuit configured to amplify input power, an impedance matching circuit, and a resonator including a conductor formed on a surface of an annular shaped structure, and a radius of curvature of a first side facing a center portion of the annular shaped structure is smaller than a radius of curvature of a second side facing an outer periphery of the annular shaped structure.

In a cross section of the annular shaped structure, a first area $A_b$ of a first region formed by the first side facing the center portion of the annular shaped structure among regions formed outside the annular shaped structure within a minimum area rectangle configured to receive the cross section of the annular shaped structure is greater than a second area $A_c$ of a second region formed by the second side facing the outer periphery of the annular shaped structure.

As described above, a wireless power transmission device includes an amplifying circuit configured to amplify input power, an impedance matching circuit, and a resonator including a conductor formed on a surface of an annular shaped structure, and in a cross section of the annular shaped structure, a first area $A_b$ of a first region formed by a first side facing a center portion of the annular shaped structure among regions formed outside the annular shaped structure within a minimum area rectangle configured to receive the cross section of the annular shaped structure is greater than a second area $A_c$ of a second region formed by a second side facing the outer periphery of the annular shaped structure.

The cross section of the annular shaped structure is formed in a curved surface.

The cross section of the annular shaped structure is formed in a polygon.

As described above, a wireless power transmission device includes an amplifying circuit configured to amplify input power, an impedance matching circuit, and a resonator including a conductor formed on a surface of an annular shaped structure, and in a cross section of the annular shaped structure, a maximum length $W_a$ in a first direction perpendicular to a direction facing a center portion of the annular shaped structure from the annular shaped structure is greater than a maximum length $W_b$ in a second direction corresponding to a direction facing the center portion of the annular shaped structure.

A ratio of the maximum length in the first direction to the maximum length in the second direction is greater than 3 and less than 5.

A ratio of the maximum length in the first direction to the maximum length in the second direction is greater than 1 and less than 10.

A ratio of the maximum length in the first direction to the maximum length in the second direction is greater than 1.5 and less than 5.

The ratio of the maximum length in the first direction to the maximum length in the second direction is greater than 2 and less than 4.5.

Herein, each element (e.g., module or program) of the above-described elements may include a single entity or multiple entities, and some of the multiple entities may be separately disposed in another element. One or more of the above-described elements or operations may be omitted, or one or more other elements or operations may be added. Alternatively or additionally, a plurality of elements (e.g., modules or programs) may be integrated into a single element. In such a case, the integrated element may still perform one or more functions of each of the plurality of elements in the same or similar manner as they are performed by a corresponding one of the plurality of elements before the integration. Operations performed by the module, the program, or another element may be performed sequentially, in parallel, repeatedly, or heuristically, or one or more of the operations may be executed in a different order or omitted, or one or more other operations may be added.

While the present disclosure has been described with reference to various embodiments, various changes may be made without departing from the spirit and the scope of the present disclosure, which is defined, not by the detailed description and embodiments, but by the appended claims and their equivalents.

What is claimed is:

1. A resonator comprising:
   a conductor formed on a surface of an annular shaped structure, and having a first end and a second end opposite to the first end; and
   a capacitor having a first end and a second end opposite to the first end,
   wherein a radius of curvature of a first curved side facing a center portion of the annular shaped structure in a cross section of the annular shaped structure is smaller than a radius of curvature of a second curved side facing an outer periphery of the annular shaped structure in the cross section of the annular shaped structure, and
   wherein the first end and the second end of the conductor are electrically connected to the first end and the second end of the capacitor, respectively.

2. The resonator of claim 1,
   wherein, in the cross section of the annular shaped structure, a first area of a first region formed by the first curved side facing the center portion of the annular shaped structure among regions formed outside the annular shaped structure within a minimum area rectangle configured to receive the cross section of the annular shaped structure is greater than a second area of a second region formed by the second curved side facing the outer periphery of the annular shaped structure.

3. A resonator comprising:
   an annular shaped structure; and
   a conductor formed on a surface of the annular shaped structure,
   wherein, in a cross section of the annular shaped structure, a first area of a first region formed by a first curved side facing a center portion of the annular shaped structure among regions formed outside the annular shaped structure within a minimum area rectangle configured to receive the cross section of the annular shaped structure is greater than a second area of a second region formed by a second curved side facing the outer periphery of the annular shaped structure.

4. The resonator of claim 3,
   wherein the cross section of the annular shaped structure is formed in a curved surface.

5. The resonator of claim 3,
   wherein the cross section of the annular shaped structure is formed in a polygonal shape.

6. A resonator comprising:
   an annular shaped structure; and
   a conductor formed on a surface of the annular shaped structure,
   wherein, in a cross section of the annular shaped structure, a maximum length in a first direction perpendicular to a direction from the annular shaped structure toward a center portion of the annular shaped structure is greater than a maximum length in a second direction corresponding to a direction facing the center portion of the annular shaped structure, and
   wherein, in the cross section of the annular shaped structure, a first area has a first curved region formed by a first side facing a center portion of the annular shaped structure among regions formed outside the annular shaped structure and a second area has a second curved region formed by a second side facing the outer periphery of the annular shaped structure.

7. The resonator of claim 6,
   wherein a ratio of the maximum length in the first direction to the maximum length in the second direction is greater than 3 and is less than 5.

8. The resonator of claim 6,
   wherein a ratio of the maximum length in the first direction and the maximum length in the second direction is greater than 1 and is less than 10.

9. The resonator of claim 8,
   wherein a ratio of the maximum length in the first direction and the maximum length in the second direction is greater than 1.5 and is less than 5.

10. The resonator of claim 9,
    wherein the ratio of the maximum length in the first direction and the maximum length in the second direction is greater than 2 and is less than 4.5.

11. A wireless power transmission device comprising:
    an amplifying circuit configured to amplify input power;
    an impedance matching circuit electrically connected to the amplifying circuit;
    a feeding loop electrically connected to the impedance matching circuit; and
    a resonator electromagnetically coupled to the feeding loop,
    wherein the resonator comprises a conductor formed on a surface of the annular shaped structure and having a first end and a second end opposite to the first end, and the capacitor having a first end and a second end opposite to the first end, and
    wherein a radius of curvature of a first curved side facing a center portion of the annular shaped structure in a cross section of the annular shaped structure is smaller than a radius of curvature of a second curved side facing an outer periphery of the annular shaped structure in a cross section of the annular shaped structure, and the first end and the second end of the conductor and the first end and the second end of the capacitor are electrically connected to each other, respectively.

12. The wireless power transmission device of claim 11, wherein, in the cross section of the annular shaped structure, a first area of a first region formed by the first curved side facing the center portion of the annular shaped structure among regions formed outside the annular shaped structure within a minimum area rectangle configured to receive the cross section of the annular shaped structure is greater than a second area of a second region formed by the second curved side facing the outer periphery of the annular shaped structure.

13. A wireless power transmission device comprising:
an amplifying circuit configured to amplify input power;
an impedance matching circuit; and
a resonator, wherein
the resonator comprises a conductor formed on a surface of the annular shaped structure, and
wherein, in a cross section of the annular shaped structure, a first area of a first region formed by a first curved side facing a center portion of the annular shaped structure among regions formed outside the annular shaped structure within a minimum area rectangle configured to receive the cross section of the annular shaped structure is greater than a second area of a second region formed by a second curved side facing the outer periphery of the annular shaped structure.

14. The wireless power transmission device of claim 13, wherein the cross section of the annular shaped structure is formed in a curved surface.

15. The wireless power transmission device of claim 13, wherein the cross section of the annular shaped structure is formed in a polygonal shape.

16. A wireless power transmission device comprising:
an amplifying circuit configured to amplify input power;
an impedance matching circuit; and
a resonator, wherein
the resonator comprises a conductor formed on a surface of the annular shaped structure, and
wherein, in a cross section of the annular shaped structure, a maximum length in a first direction perpendicular to a direction facing a center portion of the annular shaped structure from the annular shaped structure is greater than a maximum length in a second direction facing the center portion of the annular shaped structure, and
wherein, in the cross section of the annular shaped structure, a first area has a first curved region formed by a first side facing a center portion of the annular shaped structure among regions formed outside the annular shaped structure and a second area has a second curved region formed by a second side facing the outer periphery of the annular shaped structure.

17. The wireless power transmission device of claim 16, wherein a ratio of the maximum length in the first direction and the maximum length in the second direction is greater than 3 and is less than 5.

18. The wireless power transmission device of claim 16, wherein a ratio of the maximum length in the first direction and the maximum length in the second direction is greater than 1 and is less than 10.

19. The wireless power transmission device of claim 18, wherein a ratio of the maximum length in the first direction and the maximum length in the second direction is greater than 1.5 and is less than 5.

20. The wireless power transmission device of claim 19, wherein a ratio of the maximum length in the first direction and the maximum length in the second direction is greater than 2 and is less than 4.5.

* * * * *